Patented Sept. 27, 1932

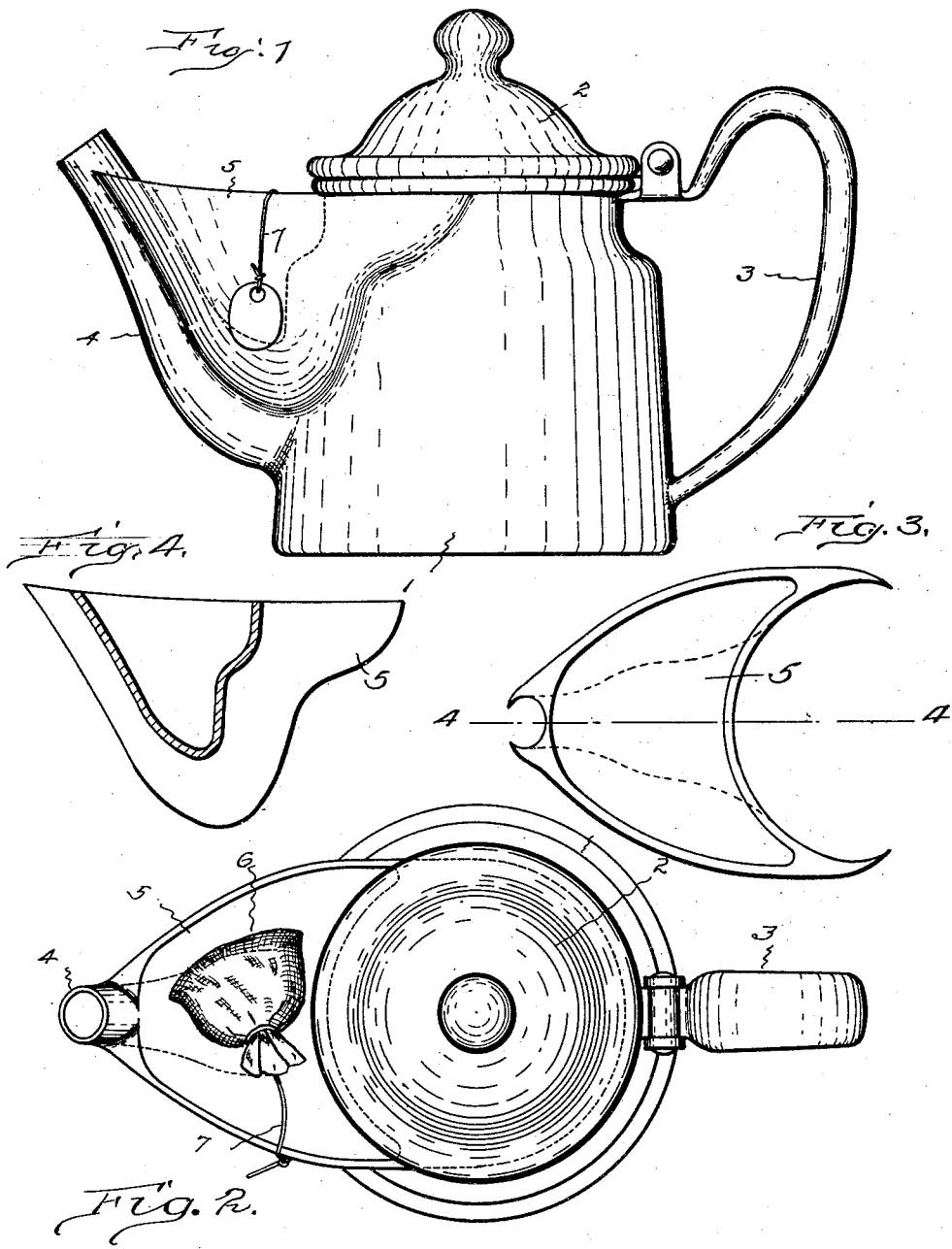

1,879,654

UNITED STATES PATENT OFFICE

HENRY J. BLAKESLEE, OF MARLBORO, CONNECTICUT

TEAPOT

Application filed December 24, 1930. Serial No. 504,527.

In hotels, restaurants, clubs and tea rooms when tea is ordered usually the hot water is served in a pot and the tea leaves supplied in a ball or bag and the ball or bag dropped into the pot and allowed to remain until the brew is of the required strength. In order to prevent the brew from becoming too strong while the first cup is being consumed the ball or bag is lifted from the pot and the question arises where to deposit it so that the drip will not soil the table or stain the linen.

The object of the present invention is to provide a simple, convenient and easily cleaned drip retaining cup or receptacle, either formed integral with or otherwise tightly applied to the pot, in which the ball or bag may be deposited to catch all drip.

In the accompanying drawing Fig. 1 shows a side elevation of one style of pot constructed according to this invention. Fig. 2 shows a top view of the same. Fig. 3 shows a plan view of a cup detached from the pot. Fig. 4 shows a vertical section of the cup on plane indicated by dotted line 4—4 on Fig. 3.

The pot 1 may be made of metal or crockery with a cover 2, handle 3, and spout 4, of any approved design. In the embodiment of the invention illustrated on the exterior between the spout and the body of the pot is a cup or receptacle 5. This receptacle may be made integral with the pot and spout, or it may be formed of different material such as rubber, metal or clay and closely fitted in place so that there will be no leakage around its lower edges. When the ball or bag 6 containing the tea leaves is lifted from the pot by its chain or cord 7 it may be at once placed in this receptacle which is of a shape and depth sufficient to receive the ball or bag and retain the drippings while the pot is being used.

The teapot may be made in various shapes and of different materials, as may be the drip receptacle, and the drip receptacle may if desired be located in other positions than between the body and the spout.

The invention claimed is:

1. A teapot comprising a body, cover, handle and spout, and a cup with an open upper end located between the top of the body of the pot and the upper surface of the spout and adapted to receive a tea ball or bag.

2. A teapot comprising a body, cover, handle and spout extending from the body below the top, and a cup with a wide open upper end located in the space between the top of the body and the spout and adapted to receive a tea ball or bag.

3. A teapot comprising a body, cover, handle and spout with a cup having an open upper end detachably located in the space between the body and the spout.

4. A teapot comprising a body, cover, handle and spout, and a cup with a wide open upper end, located in the space between and formed integral with the top of the body and upper surface of the spout.

HENRY J. BLAKESLEE.